(12) United States Patent
Chen

(10) Patent No.: US 8,129,948 B2
(45) Date of Patent: *Mar. 6, 2012

(54) PROTECTIVE CIRCUITS FOR SECONDARY BATTERY PACKS

(75) Inventor: Fang Chen, Shenzhen (CN)

(73) Assignee: BYD Company Limited, Guangdong (CN)

( * ) Notice: Subject to any disclaimer, the term of this patent is extended or adjusted under 35 U.S.C. 154(b) by 783 days.

This patent is subject to a terminal disclaimer.

(21) Appl. No.: 12/096,363

(22) PCT Filed: Dec. 7, 2006

(86) PCT No.: PCT/CN2006/003319
§ 371 (c)(1),
(2), (4) Date: Nov. 13, 2008

(87) PCT Pub. No.: WO2007/065362
PCT Pub. Date: Jun. 14, 2007

(65) Prior Publication Data
US 2009/0315517 A1     Dec. 24, 2009

(30) Foreign Application Priority Data
Dec. 7, 2005 (CN) .......................... 2005 1 0022293

(51) Int. Cl.
    *H02J 7/00* (2006.01)
(52) U.S. Cl. .......... 320/134; 320/135; 320/136; 361/90; 361/91.1
(58) Field of Classification Search .......... 320/134–136; 361/90, 91.1
    See application file for complete search history.

(56) References Cited

U.S. PATENT DOCUMENTS

| 3,916,508 A | 11/1975 | Conzelmann et al. |
| 4,053,713 A * | 10/1977 | Nitadori ........................ 370/206 |
| 5,493,197 A * | 2/1996 | Eguchi et al. ................. 320/116 |
| 5,610,495 A * | 3/1997 | Yee et al. ...................... 320/116 |
| 5,631,537 A | 5/1997 | Armstrong |
| 6,060,864 A | 5/2000 | Ito et al. |
| 6,268,710 B1 | 7/2001 | Koga |

(Continued)

FOREIGN PATENT DOCUMENTS

CN       1489252 A       4/2004

(Continued)

OTHER PUBLICATIONS

PCT International Search Report for PCT Counterpart Application No. PCT/CN2006/003319 containing Communication relating to the Results of the Partial International Search Report, 4 pgs., (Mar. 22, 2007).

(Continued)

*Primary Examiner* — Samuel Berhanu
(74) *Attorney, Agent, or Firm* — Blakely, Sokoloff, Taylor & Zafman LLP.

(57) ABSTRACT

This invention discloses a charging/discharging protective circuit for a secondary battery pack, having an over-charging/discharging voltage comparator, a reference voltage source and a battery status decision circuit. There is also a sampling circuit having a sequential pulse generator for generating pulses for selecting one of the batteries in the battery pack for testing purposes. The pulse generator provides M-channel gating pulses to the selection circuit of the battery under test and provides sampling pulses to the over-charging/discharging voltage comparators. The reference voltage source has a regulated output circuit. This invention uses time division inspection methods to provide a cost-effective solution for inspecting batteries in a battery pack.

18 Claims, 3 Drawing Sheets

U.S. PATENT DOCUMENTS

| | | |
|---|---|---|
| 6,377,429 B1 | 4/2002 | Descombes |
| 2004/0101744 A1* | 5/2004 | Suzuki ............................. 429/61 |

FOREIGN PATENT DOCUMENTS

| | | |
|---|---|---|
| CN | 2640097 Y | 9/2004 |
| CN | 2651946 Y | 10/2004 |
| CN | 1553540 A | 12/2004 |
| JP | 11-122838 A | 4/1999 |
| JP | 2003-111294 A | 4/2003 |
| JP | 2005-168159 A | 6/2005 |
| KR | 1019990045479 | 6/1999 |
| KR | 100297608 | 5/2001 |

OTHER PUBLICATIONS

English translation of the First Office Action for Korean Patent Application No. KR2008-7016386, Jun. 15, 2010, 3 pages.

First Office Action for Chinese patent application No. 200510022293.4, 2008, 8 pages.

Supplemental European Search Report for EP06828267.2, Jan. 26, 2009, 7 pages.

First European Examination Report issued by the EPO for EP06828267.2, Oct. 23, 2009, 3 pages.

English translation of the Second Office Action for Korean Patent Application No. KR2008-7016386, Nov. 30, 2010, 3 pages.

* cited by examiner

PROTECTIVE CIRCUITS FOR SECONDARY BATTERY PACKS

CROSS REFERENCE

This is a National Phase of International Application No. PCT/CN2006/003319, filed on Dec. 7, 2006, which claims priority from Chinese Patent Application No. 200510022293.4, filed on Dec. 7, 2005.

FIELD OF INVENTION

This invention involves protective integrated circuits for secondary batteries and, in particular, protective charging/discharging circuits for secondary battery packs.

BACKGROUND

In lithium ion batteries storing high density internal energy, excessive accumulation of internal heat while in the over-charged state could damage battery performance and life, and, in particular, may result in a battery explosion and even fire. Therefore, such lithium ion batteries must have a well-designed protective circuit to ensure safety during the over-charged/discharged states and to prevent performance deterioration as well. Most of the available integrated circuits for protection of lithium ion battery packs (hereinafter IC) utilize pure analogue circuits. Different reference voltage source ICs produced with CMOS technology using different doping concentrations are not completely the same, and the thresholds for over-charging/discharging protection will vary within a certain range. A large number of divider (bleed) resistors can be designed into the IC by the designer based on such variations. There are also a large number of regulation points (for adjustment of variations) that can be designed in to adjust the resistors. Both of these approaches make it possible to adjust the divider (bleed) resistance during intermediate testing according to the desired voltage ratio and after the wafer has been manufactured. As a result, the resistance may be kept basically constant to meet the use requirements or specification. Normally, the IC has a number of variable resistors, comparator and reference voltage sources, occupying about 40% of the IC area. The accuracy of such adjustment remains relatively low, and the protective voltage threshold of each battery has to be corrected separately. To ensure adequate accuracy, a laser is used to adjust to around 100 regulation points for 3-4 batteries, thus increasing production cost accordingly. Therefore, it is desirable to have a simpler and more cost effective protective circuit for the charging and discharging and inspection of battery packs.

SUMMARY OF THE INVENTION

The technical problem to be solved by this invention is to overcome the defects of the present technology and propose a protective circuit of low cost and high accuracy for charging and discharging of secondary battery packs.

Briefly, for the charging and discharging protective circuit for the secondary battery pack, the secondary battery pack may have multiples of M batteries (where M is more than 2), where the protective circuit including charging/discharging voltage comparators, a reference voltage source which provides comparative reference voltage, and a battery status decision circuit connected to the output of the over-charging/discharging voltage comparator. The output of the said battery status decision circuit is connected to the battery charging/discharging control circuit, which controls the charging and discharging of the batteries in the battery pack.

There is a sampling circuit for controlling the sampling of the voltage levels of the batteries and having a sequential pulse generator, which provides M-channel gating pulses (or strobes) to the selection circuit of the battery under test and provides sampling pulses to the over-charging/discharging voltage comparator. The said M-channel gating pulses connect sequentially the M batteries under test to the comparative voltage inputs of the voltage comparator, respectively. The sampling pulses allow the sending of samples of the comparison results of the voltage comparator to the battery status decision circuit.

DESCRIPTION OF THE DRAWINGS

The following are further descriptions of the invention with references to figures and examples of their applications.

DETAILED DESCRIPTION OF THE PREFERRED EMBODIMENTS

Figure 1:
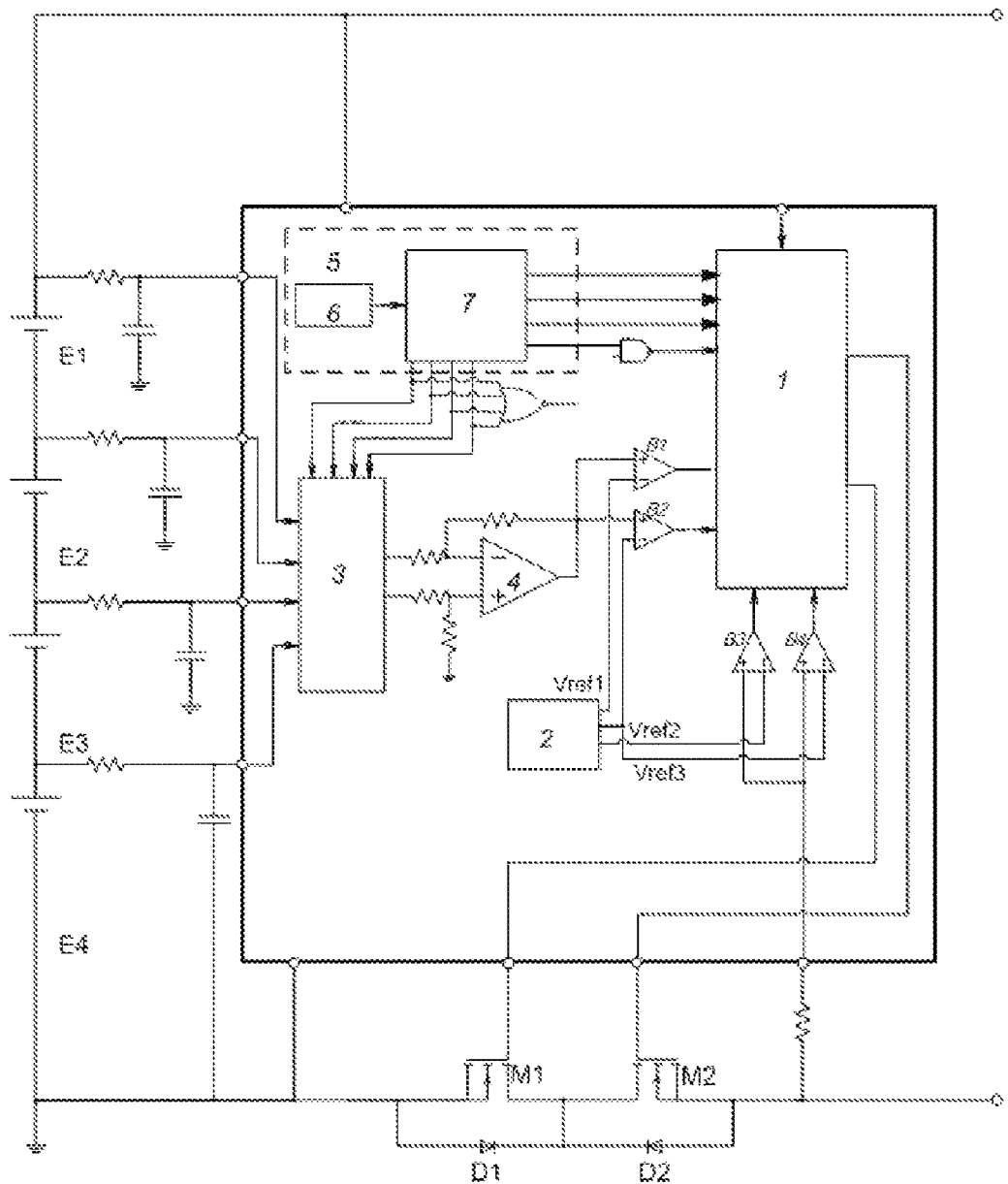
FIG. 1 is a method embodiment of this invention, showing a block diagram.

The technical problem to be solved by this invention is to overcome the defects of the present technology and propose a protective circuit of low cost and high accuracy for charging/discharging of secondary battery packs. The technical problems in this invention can be solved in the following manner.

For the charging/discharging protective circuit for a secondary battery pack, the secondary battery pack having multiples of M batteries (where M is more than 2), the circuit including charging/discharging voltage comparators, a reference voltage source which provides comparative reference voltage levels, and a battery status decision circuit connected to the output of the voltage comparators. The output of the said battery status decision circuit is connected externally to the battery charging/discharging control circuit for controlling the charging and discharging of the batteries in the battery pack.

The protective charging/discharging circuit for a secondary battery pack includes the following:
 a comparative voltage source for the voltage comparators; and
 a sampling circuit for the battery voltage having a sequential pulse generator, which provides M-channel gating pulses (or strobes) to the selection circuit and provides sampling pulses to the voltage comparators. The said M-channel gating pulses allow the connecting sequentially of the M batteries under test to the voltage comparators, respectively. The sampling pulses allow the sending of the comparison results of the voltage comparators to the battery status decision circuit.

A secondary battery pack is an energy-storage component with its terminal voltage varying slowly during normal conditions, and its charging/discharging process being a continuous and smooth process. Therefore, the comparative voltage of the over-charging/discharging voltage comparator is sampled intermittently, and the voltage of the battery under test is inspected at set time intervals.

On the other hand, over-current and short-circuit conditions are abrupt abnormalities and must be protected immediately. Therefore, comparative voltage for the over-current and short-circuit inspection voltage comparators is provided in a continuously on-line method. Otherwise, when there is no inspection of the batteries under test, the entire circuitry remains in a hibernation state for the purpose of reducing power consumption, except the continuously on-line monitoring for over-current and short-circuit conditions.

Technical problems in this invention are further solved in the following way:

The reference voltage source has a regulated output circuit for adjusting the protective circuit to be within specification after manufacturing.

In the regulated output circuit of the said reference voltage source, a multi-stage voltage divider is comprised of adjustable-ratio resistors and fixed-ratio resistors providing stepwise adjusted resistance.

Both ends of the said serial adjustable-ratio resistors are pressure welding points for probe test, across which are fuses that may melt when over-voltage or over-current conditions occur.

The sequential pulse generator, including a square wave generator, a cascaded oscillator, a frequency divider, and an amplifier, intermittently inspects the voltage of the battery under test at set time intervals. When the gating pulses of a channel are at the high level, the corresponding terminal voltage of the battery under test will be sent to the input of comparative voltage of the voltage comparator via the level conversion circuit. M-channel sampling pulses, which are at the high level only during the intervals set for the high level, will send the comparison results of the voltage comparators to the battery status decision circuit.

Technical problems in this invention are solved on the following selective basis:

The said secondary battery pack is a lithium ion battery pack.

M is an integer between 2 and 8. For the preferred selection, M is 3 or 4.

The level conversion circuit is a differential operational amplifier.

The reference voltage source is a current amplification circuit at zero temperature shift and intermittent energy band. Variation of reference operating points due to load variation at output terminals can be separated, and a stable reference comparative voltage can be provided.

The circuits may be either hybrid discrete digital/analogue circuits, or hybrid integrated digital and analogue circuits. Layout can be made for the IC by using small line width.

In comparing the technology available now with the present invention, the sampling circuits described herein create a time division inspection system such that the number of regulating points needed to create the protection threshold voltage for the calibrating of the protective circuit can be minimized and, in the preferred embodiment, reduced to 6 regulating points, thus minimizing the need for wafer testing, saving regulation time, and test equipment cost. The adjustment step for the threshold voltage for over-charging protection can be as high as 3.3 mV, and the system regulation step, namely the step accuracy, can be 10 mV. The protection threshold for over-discharging, over-current and short circuit can reach an accuracy of 5%. Accuracy of time delays reaches 30%, which is 50% better than the existing technology.

As shown in FIG. 1, for the charging/discharging protective circuit of a battery pack, the battery pack may comprise 4 cascaded lithium ion batteries: E1, E2, E3 and E4. The protective circuit includes voltage comparators B1, B2, B3 and B4 for detecting over-charging, over-discharging, over-current and short circuit. There is also a reference voltage source 2, providing them with comparative reference voltage levels respectively. There is also a battery status decision circuit 1 connected to the outputs of voltage comparators B1, B2, B3 and B4. The output of said battery status decision circuit 1 is connected to a control circuit for battery charging and discharging, which in one embodiment can be the field effect transistor M1 and M2 and freewheeling diode D1 and D2. The battery status decision circuit 1 includes four 8-digit counters for over-charging/discharging delay, a 4-digit counter for over-current delay and auxiliary circuits. As over-charging and over-discharging will not occur at the same time, sharing of a group of counters can save a number of elements.

There is a comparative voltage source, comprising a selection circuit 3 for selecting one of the batteries for testing E1~E4 and a level conversion circuit 4, which provides an interface between the selection circuit and voltage comparator B1. The level conversion circuit 4 with a 2-stage differential operational amplifier, adopting common-source and common-grid output, can satisfy the need for bandwidth. It has a large amplification multiplier, high common-mode rejection ratio, and low power consumption.

There is a sampling circuit for battery voltage, including a sequential pulse generator 5, which provides 4-channel pulses to the selection circuit for the selection of a battery E1~E4 and sampling pulses to voltage comparator B1 and B2. The said 4-channel gating pulses allows the sequential connection of one of the batteries E1~E4 to be under test by connecting the selected battery to comparative voltage input terminals of the voltage comparators B1 and B2. Note that the comparative voltages from the voltage comparators B1 and B2 are generated by the intermittent sampling method (from pulses generated by the sampling circuit). On the other hand, the comparative voltage of the over-current and short-current detection voltage comparators B3 and B4 are provided by a continuous online detection method. These comparative voltage inputs are connected to the discharging loop. The said sampling pulses allow the sending of the comparison results from the over-charging/discharging voltage comparators to the battery status decision circuit.

Figure 2:
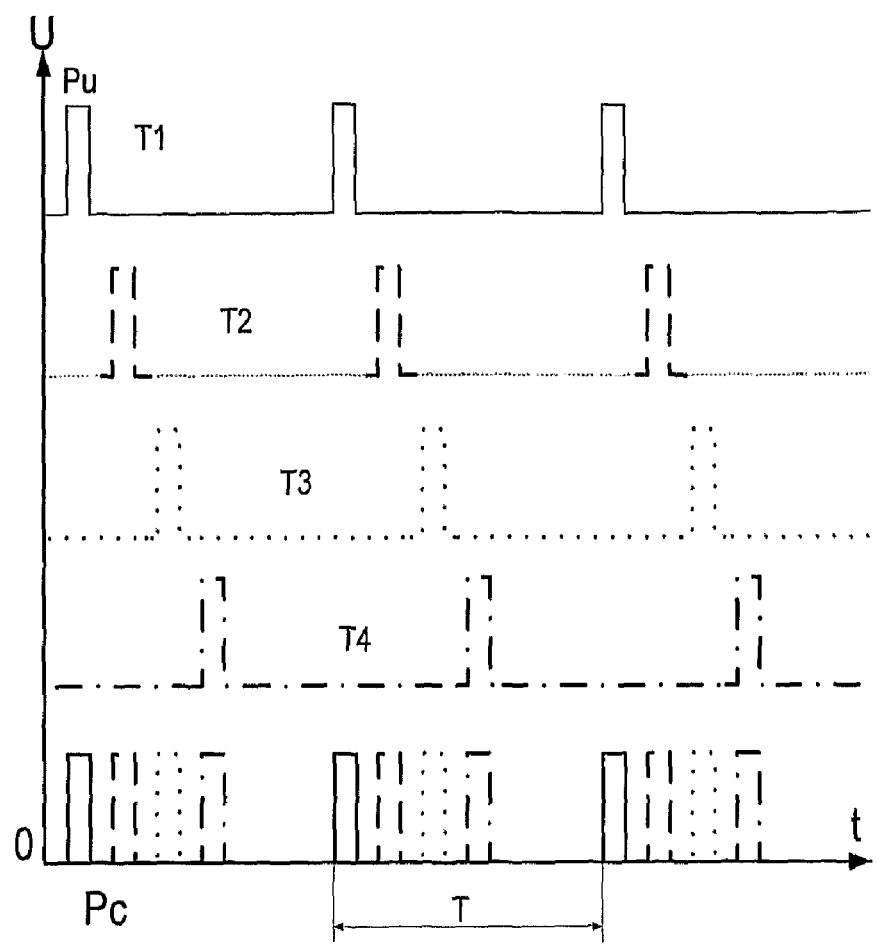
FIG. 2 is an embodiment of this invention, showing a sequential wave diagram for a 4-channel gating pulses (or strobes)
Figure 3:
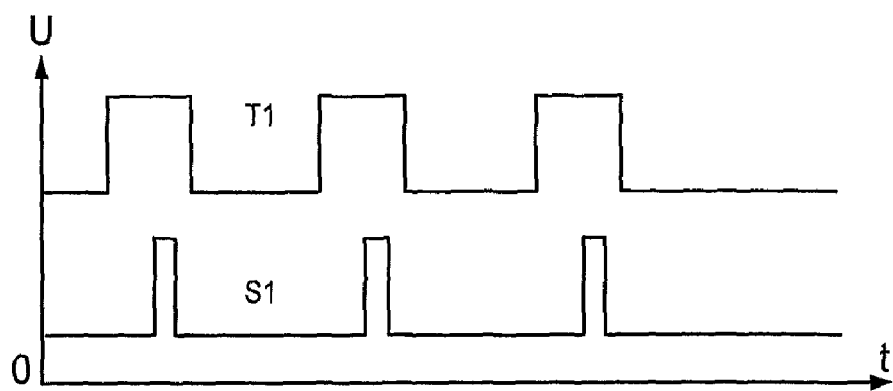
FIG. 3 is an embodiment of this invention, showing a one-channel gating pulses and the corresponding sequential wave diagram for sampling pulses.

In the preferred method, the battery inspection cycle is set at T=10 mS, namely, voltages of the batteries are inspected at 10 mS intervals. Furthermore, the width of gating pulses for the batteries under test E1~E4 is set at Pu=200 μS, gating pulse interval between two adjacent batteries at Pc=200 μS, and sampling pulse width of batteries under test E1~E4 at Pd=¼, Pu=50 μS. They are set at ½~¾ of the corresponding gating pulses so as to avoid influence from level variation. The sequential waveform of 4-channel gating pulses, as well as the sequential waveform of one-channel gating pulses and the corresponding sampling pulses are shown in FIGS. 2 and 3. The upper waveform in FIG. 3 is a sequential waveform of one of the channels in providing gating pulses, while the lower waveform is a sequential waveform of the corresponding sampling pulses.

The reference voltage source 2 has a regulated output circuit 8, whereby the series of adjustable-ratio resistors of stepwise adjusted values R1-1, R1-2, R1-3, R1-4, R1-5, R1-6 and R1-7 as well as fixed ratio resistors R2, R3 and R4 form a multi-stage voltage divider, and 6 adjustment points are provided accordingly.

Both ends of said series of adjustable-ratio resistors R1-1~R1-7 are pressure welding points P0~P6 for probe test, across which are F0~F5 fuses, that can be broken when over-current or over-voltage condition occurs.

The sequential pulse generator 5 is a square wave generator including a cascaded oscillator 6, a quad frequency divider and an amplifier 7, with oscillator generating a square wave signal at 20K frequency. When a channel of gating pulses is at a high level, the terminal voltage of the corresponding battery under test is sent via a level conversion circuit 4 to the comparative voltage inputs of over-charging/discharging voltage comparators B1 and B2. On the other hand, the 4-channel sampling pulses, which are at a high level only during the period set for the high level, allow the sending of the comparison results of corresponding over-charging/discharging voltage comparators B1 and B2 to the battery status decision circuit 1.

The reference voltage source 2 has a current amplification circuit, zero temperature shift and intermittent energy band, and its output voltage is 2.5V.

The protective circuit operates in the following way: the 4-channel gating pulses generated by sequential pulse generator 5 controls the selection circuit 3 to sequentially connect one of the batteries E1~E4 to the level conversion circuit 4. Relative voltage on both terminals of the selected battery is changed to absolute voltage with reference to the ground, and is applied respectively to the voltage comparators B1 and B2 for comparison with their respective reference voltages. The comparison result (compared levels) is sampled by sampling pulses generated from the sequential pulse generator 5, and the sampled result is sent to the battery status decision circuit 1. The battery status decision circuit 1 counts the continuously sampled result of the same battery, and finally sends a corresponding control level to the charging/discharging control circuit. Such control circuit may use field effect transistor M1 and M2 as well as freewheeling diode D1 and D2. The purpose of the control circuit is to protect the battery pack from abnormal battery conditions.

Figure 4:
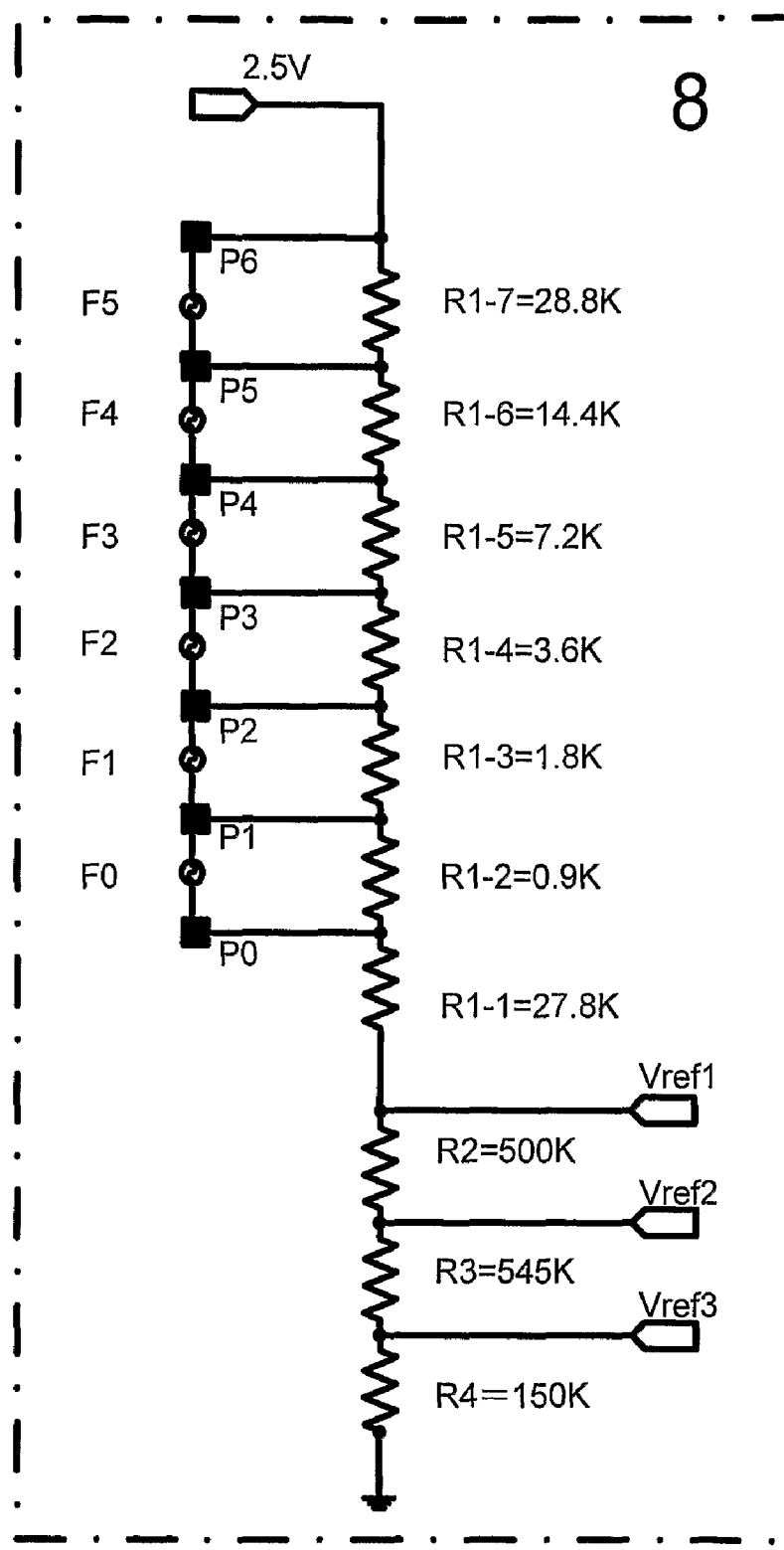
FIG. 4 is a method of this invention, showing the regulated output circuit diagram for the reference voltage source.

As shown in FIG. 4, in the regulated output circuit 8 of reference voltage source 2, Vref 1 is the comparative reference voltage for the over-charging voltage comparators B1, Vref 2 is the comparative reference voltage for over-discharging voltage comparator B2 and short circuit detection voltage comparator B4, and Vref 3 is the comparative reference voltage for over-current detection voltage comparator B3. The characteristics of the lithium battery themselves confine the protective threshold for over-charging normally to 4.2V~4.4V. In case of an excessively low threshold, the battery can not be fully charged, as it is placed under protection before the battery is fully charged. In case of an excessively high threshold, there will be a risk of battery expansion and break and even explosion. In this specific implementation method, the voltage threshold for charging protection is made continuously adjustable in the range of 4.2V~4.4V (center value 4.3V) by regulating adjustment resistor R1. Voltage threshold for over-discharging protection is around 2.5V, voltage threshold for over-current protection is around 0.3V, and voltage threshold for short circuit protection is around 1.25V. All the resistors in FIG. 4 are ratio-resistors, with their resistance being given in the figures. R1 is in the range of 27.8KΩ~84.5 KΩ, continuously adjustable in steps of 0.9KΩ. Through adjustment of resistance of R1, the voltage threshold for over-charging protection is made continuously adjustable in the range of 4.202V~4.398V, with its maximal adjustment step being as small as 3.3 mV. Considering differences in resistance as well as offset voltage of the level conversion circuit, the system adjustment step of the voltage threshold for over-charging protection is made to be 10 mV through emulation and calculation. In other words, the regulated voltage threshold for IC over-charging protection can be continuously adjustable in the range of 4.2V~4.4V, with the adjustment accuracy being ±10 mV of the set value. The variation range of the voltage thresholds for over-discharging protection, short circuit protection and over current protection can be determined on the basis of the range of voltage threshold for over-charging protection. Considering etching accuracy of the resistors, uneven doping concentration, the nominal range of the variation of voltage thresholds for over-discharging protection, short circuit protection and over current protection is set at 5%. All ratio resistors are in the form of cascaded and parallel resistor units of equal length and width, and pseudo resistors are added on both sides to reduce environmental impact and strengthen consistency of resistance values.

The above content is a further detailed description of this invention in combination with specific selective implementation methods, and the specific implementation of this invention can not be considered to be confined to such descriptions. Ordinary technicians, working in the filed of technology of this invention, can make some simple inferences or substitutions under the prerequisite of not departing from the conception of this invention. Such inferences or substitutions should all be deemed to fall in the range of patent protection as determined in the claims submitted for this invention.

What is claimed is:
1. A protective circuit for a secondary battery pack having a plurality of batteries, comprising:
a sampling circuit that includes a sequential pulse generator to generate gating pulses for selecting one or more of the plurality of batteries for inspection, and to generate sampling pulses for inspecting the selected batteries at predetermined time intervals, wherein the width of the sampling pulses are set at ½ to ¾ of a width of corresponding gating pulses;
a selection circuit to receive said gating pulses and select a battery in the battery pack;
a reference voltage source providing one or more reference levels;
a plurality of voltage comparators each receiving one of the reference levels to compare with the level of the selected battery and generating one or more compared levels;
a battery status decision circuit connected to the comparators generating control signals as a function of the compared levels; and a battery charging/discharging control circuit for controlling the charging or discharging of the selected battery in response to the control signals.
2. The protective circuit of claim 1 wherein the reference voltage source has a regulated output circuit allowing the calibration of protection thresholds.
3. The protective circuit of claim 2 wherein in the regulated output circuit, there is a multi-stage voltage divider with adjustable-ratio resistors and fixed-ratio resistors providing stepwise adjusted resistance for calibrating the protective circuit to be within predetermined inspection ranges.
4. The protective circuit of claim 1 wherein the sampling circuit further includes a square wave generator, cascaded oscillator, frequency divider, and amplifier.
5. The protective circuit of claim 1 wherein the sampling circuit causes the intermittent inspection of the voltages of the batteries at set time intervals.
6. The protective circuit of claim 1 wherein the batteries of the secondary battery pack are lithium ion batteries.
7. The protective circuit of claim 1 wherein the battery pack is configured in multiples of M batteries where M is an integer between 2 and 8.

8. The protective circuit of claim 1 further including a level conversion circuit connected between the selection circuit and the comparators.

9. The protective circuit of claim 8 wherein the level conversion circuit is a differential operational amplifier.

10. The protective circuit of claim 1 the protective circuit is a discrete digital and analog circuit.

11. The protective circuit of claim 1 the protective circuit is an integrated digital and analog circuit.

12. A protective circuit for a secondary battery pack having a plurality of batteries, comprising:
- a sampling circuit that includes a sequential pulse generator to generate gating pulses for selecting one or more of the plurality of batteries for inspection, and to generate sampling pulses for inspecting the selected batteries at predetermined time intervals, wherein the width of the sampling pulses are set at ½ to ¾ of a width of corresponding gating pulses;
- a selection circuit to receive the gating pulses and select a battery in the battery pack;
- a reference voltage source providing one or more reference levels, wherein the reference voltage source has a regulated output circuit allowing the calibration of protection thresholds;
- a plurality of voltage comparators each receiving one of the reference levels to compare with the level of the selected battery and generating one or more compared levels;
- a battery status decision circuit connected to the comparators generating control signals as a function of the compared levels; and
- a battery charging/discharging control circuit for controlling the charging or discharging of the selected battery in response to the control signals.

13. The protective circuit of claim 12 wherein in the regulated output circuit, there is a multi-stage voltage divider with adjustable-ratio resistors and fixed-ratio resistors providing stepwise adjusted resistance for calibrating the protective circuit to be within predetermined inspection ranges.

14. The protective circuit of claim 12 wherein the batteries of the secondary battery pack are lithium ion batteries.

15. The protective circuit of claim 12 wherein the battery pack is configured in multiples of M batteries where M is an integer between 2 and 8.

16. The protective circuit of claim 12 further including a level conversion circuit connected between the selection circuit and the comparators.

17. The protective circuit of claim 1 the protective circuit is a discrete digital and analog circuit.

18. The protective circuit of claim 1 the protective circuit is an integrated digital and analog circuit.

\* \* \* \* \*